(12) United States Patent
Ishihara

(10) Patent No.: US 7,098,445 B2
(45) Date of Patent: Aug. 29, 2006

(54) LOAD DETECTING DEVICE

(75) Inventor: Hidenori Ishihara, Kosai (JP)

(73) Assignee: Asmo Co., Ltd., Kosai (JP)

( * ) Notice: Subject to any disclaimer, the term of this patent is extended or adjusted under 35 U.S.C. 154(b) by 93 days.

(21) Appl. No.: 10/866,112

(22) Filed: Jun. 14, 2004

(65) Prior Publication Data

US 2004/0256543 A1    Dec. 23, 2004

(30) Foreign Application Priority Data

Jun. 17, 2003   (JP) .............................. 2003-171980

(51) Int. Cl.
  *H01J 5/16* (2006.01)
(52) U.S. Cl. .............................. 250/227.14; 250/227.16
(58) Field of Classification Search ........... 250/227.14, 250/227.16, 227, 227.11, 221; 385/12, 101
See application file for complete search history.

(56) References Cited

U.S. PATENT DOCUMENTS 4,618,764 A * 10/1986 Harmer .................. 250/227.14
5,419,322 A *  5/1995 Joseph ........................ 600/338

FOREIGN PATENT DOCUMENTS

| JP | U-05-73604 | 10/1993 |
| JP | U-07-25527 | 5/1995 |
| JP | A-07-151615 | 6/1995 |
| JP | A-07-190732 | 7/1995 |

* cited by examiner

*Primary Examiner*—Thanh X. Luu
*Assistant Examiner*—Tony Ko
(74) *Attorney, Agent, or Firm*—Oliff & Berridge, PLC

(57) ABSTRACT

A pressure-sensitive sensor which is a load detecting device of the present invention is structured to include: an optical fiber of a predetermined length; a light-emitting element, disposed at a longitudinal direction one end side of the optical fiber, for emitting light and making the light incident from one end of the optical fiber; a light-receiving element, disposed at a longitudinal direction other end side of the optical fiber, for receiving light which has passed through the optical fiber and outputting a signal corresponding to an amount of received light; and a power source wire for light-emission and a ground wire for light-emission which are wound around an outer periphery of the optical fiber, and are formed in spiral forms along the outer periphery, and are connected to the light-emitting element. The power source wire for light-emission, which forms a spiral form at the outer periphery of the optical fiber, functions as a pressure element and improves sensitivity of the pressure-sensitive sensor.

22 Claims, 9 Drawing Sheets

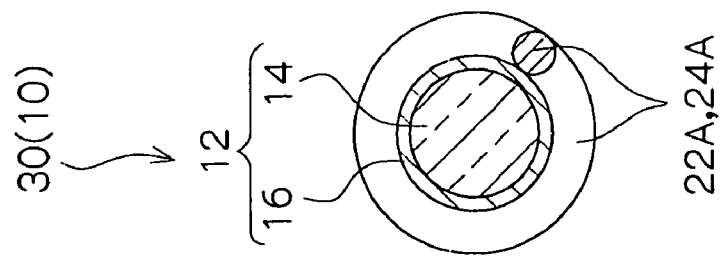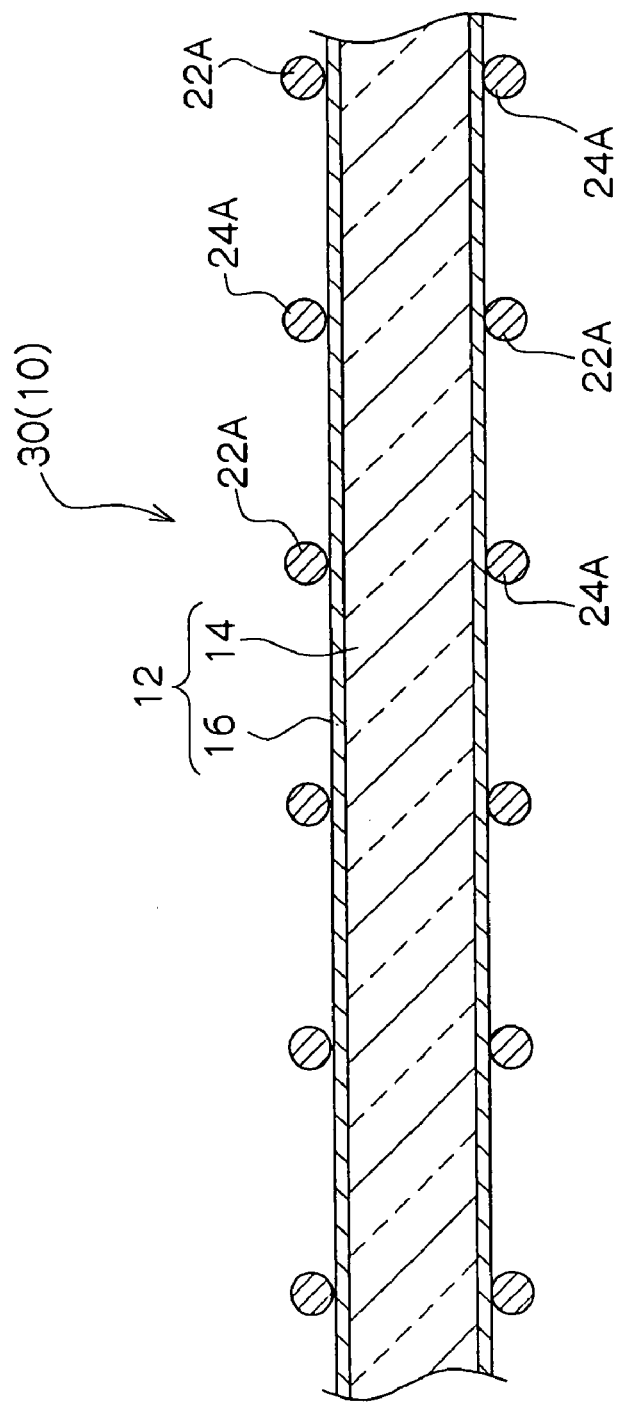

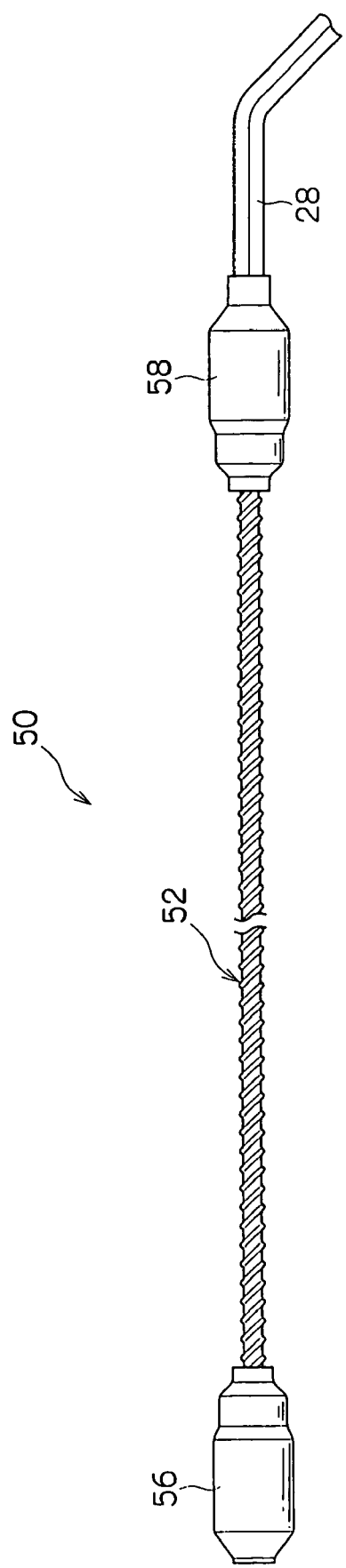

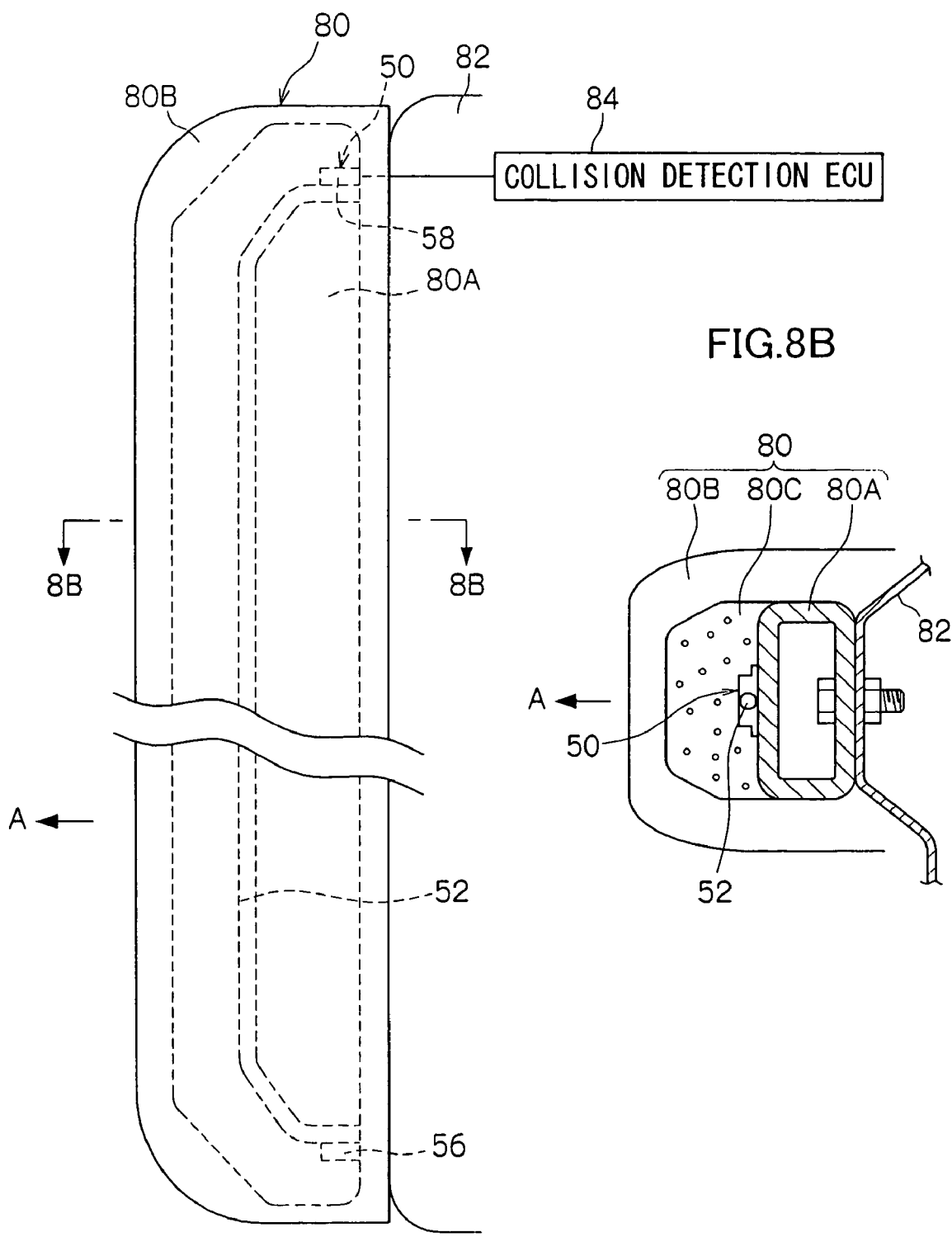

LOAD DETECTING DEVICE

CROSS-REFERENCE TO RELATED APPLICATION

This application claims priority under 35 USC 119 from Japanese Patent Application No. 2003-171980, the disclosure of which is incorporated by reference herein.

BACKGROUND OF THE INVENTION

1. Field of the Invention

The present invention relates to a load detecting device using an optical fiber.

2. Description of the Related Art

Vehicles such as automobiles and the like are equipped with catching detecting sensors for detecting that a foreign object is caught (trapped), for example, between the window frame and a side window glass which is driven by a power window device, or between the vehicle body and a motor-operated sliding door or back door. Pressure-sensitive sensors, which detect the pressing force which accompanies the catching of a foreign object (the reaction force received from the foreign object), are used as the catching sensors.

It has been thought to use an optical fiber sensor as the pressure-sensitive sensor (see, for example, Japanese Patent Application Laid-Open (JP-A) No. 7-151615). The optical fiber sensor is structured so as to include an optical fiber which is elastic, a light incident means including a light source which emits light and makes a fixed amount of the light incident at the optical fiber, and a light-receiving body which receives the light which passes through the optical fiber. On the basis of the change in the amount of light which passes through, i.e., the change in the amount of light received by the light-receiving body, which change is caused by deformation of the optical fiber, the optical fiber sensor detects the external force (pressing force) which deforms this optical fiber.

Further, a push-button device using an optical fiber is known (see, for example, Japanese Utility Model Application Laid-Open (JP-U) No. 7-025527). In this push-button device, one of a pair of optical fibers, which are divided in two in the longitudinal direction and at which light usually passes from the one to the other, is deformed by the operation of a push-button, and the passage of light to the other optical fiber is blocked. A signal corresponding to the absence/presence of operation of the push-button (an on/off signal) is outputted. Namely, this push-button device is used as a switch.

A linear external pressure sensor using an optical fiber has been conceived of as a way of detecting an accident of a submarine cable (see, for example, JP-U No. 5-073604). A sensor core which structures this linear external pressure sensor is structured by projections or protrusions being formed at the outer peripheral surface of the outer layer covering of the optical fiber core wire. When external pressure is applied to a longitudinal direction position, localized lateral pressure is applied to the optical fiber at the interior by the projection or the protrusion at that position. In this way, the fact that external force has been applied to the linear external pressure sensor, and the longitudinal direction position at which this external force is applied, can be detected.

Further, a structure is known in which a pressure-sensitive sensor using a leaky optical fiber is built-in in the bumper of an automobile as a collision sensor (see, for example, JP-A No. 7-190732).

However, in the above-described conventional optical fiber sensors, in a case in which a load (pressing force) is received substantially uniformly over a wide range in the longitudinal direction, the load per unit area (unit length) is small, and therefore, there is the problem that the sensitivity is low. Improved sensitivity of detection has been desired in particular in applications in which the sensor is applied to a vehicle and detects the catching of a relatively large object such as the hand or arm of a person or the like.

Further, in the above-described conventional push-button device, one of the optical fibers must have a free end which can be displaced with respect to the other optical fiber, and a push-button which displaces this free end. In other words, the above-described conventional push-button device must be provided with the free end, the push-button and space for allowing the stroke thereof. Therefore, the device becomes large on the whole.

Moreover, in the above-described conventional linear external pressure sensor, projections or protrusions are formed at the outer peripheral surface of the covering. Thus, the number of parts or the amount of material which is used increase, and there is the problem that the cost increases. Further, this linear external pressure sensor is used in detecting accidents at submarine cables, and no consideration has been given to, for example, the handling performance, the assemblability and the like required for application to automobiles and the like.

SUMMARY OF THE INVENTION

In view of the aforementioned, the present invention provides a load detecting device which is compact and has good sensitivity.

In order to achieve the above object, in a first aspect of the present invention, a load detecting device comprises: an optical fiber of a predetermined length; light-emitting means, disposed at a longitudinal direction one end side of the optical fiber, for emitting light and making the light incident from one end of the optical fiber; light-receiving means, disposed at a longitudinal direction other end side of the optical fiber, for receiving light which has passed through the optical fiber and outputting a signal corresponding to an amount of received light; and a connecting wire formed in a spiral form along an outer periphery of the optical fiber, for making conductive one of the light-emitting means and the light-receiving means.

In the load detecting device based on the present aspect, the light, which is made incident at the optical fiber from one end thereof by the light-emitting means, passes through the optical fiber, and is received by the light-receiving means disposed at the other end side. When the optical fiber deforms due to external force, the amount of light passing through the optical fiber, i.e., the amount of light received by the light-receiving means, changes (e.g., the transmitted light amount decreases due to the transmission loss based on the deformation). The light-receiving means outputs a signal corresponding to the received light amount, i.e., the magnitude of the external force. In this way, the load which is being applied to the optical fiber is detected.

Note that the output signal of the light-receiving means may be a signal which varies in accordance with the magnitude of the amount of light received (e.g., an analog signal), or may be a binary signal which switches based on whether or not the received light amount has exceeded a predetermined threshold value (e.g., an on/off signal).

Here, the connecting wire is formed in a spiral form along the outer periphery of the optical fiber. In other words, the inner peripheral portion of the spiral formed by the connecting wire contacts or is extremely close to the outer peripheral portion of the optical fiber. Therefore, in a case in which (the load-receiving portion of) the present load detecting device is pushed by a relatively large object or the like and external force is applied, this external force is transmitted to the optical fiber via the connecting wire which is positioned locally in the longitudinal direction. Namely, at the portion where the connecting wire, which functions as a pressure element, transmits the external force, the optical fiber locally caves-in greatly (locally deforms greatly). In this way, the sensitivity of load detection by the deformation of the optical fiber is improved.

Further, the present load detecting device is compact because it does not have parts which can move with respect to the optical fiber.

Note that the connecting wire which is in a spiral form along the outer periphery of the optical fiber, for example, may be structured by being wound in a spiral form directly on the outer peripheral portion of the optical fiber, or may be structured by the optical fiber being inserted (fit) in the interior of the spiral which is formed in advance.

In this way, the load detecting device based on the present aspect is compact and has good sensitivity. Further, the connecting wire which is for conduction to the light-emitting means or the light-receiving means functions as a pressure element. Therefore, as compared with a structure in which a connecting wire and a pressure element are provided separately, an improvement in sensitivity is achieved without increasing the number of parts or the amount of material which is used.

The connecting wire, which is wound in a spiral form around the outer peripheral portion of the optical fiber, does not impede bending of the optical fiber.

Because the connecting wire used for conduction as described above is wound around the optical fiber, the connecting wire is prevented from getting in the way at the time of setting-up the present load detecting device. Further, the portions of electrical connection between the load detecting device and the exterior can be concentrated at one longitudinal direction end side of the optical fiber.

In a second aspect of the present invention, the load detecting device of the above-described first aspect has a plurality of the connecting wires, and each connecting wire is formed in a spiral form running along the outer periphery of the optical fiber.

In the load detecting device based on the present aspect, each of the plural connecting wires is formed in a spiral form which runs along the outer periphery of the optical fiber. Namely, the connecting wires form pressure elements in two or more spirals. Therefore, at the light-emitting means or the light-receiving means, it is possible to, for example, conduct by the power source side and the ground side connecting wires such that electricity can be supplied, and to connect (establish conduction with) a signal wire or the like in addition to a power supply wire.

Moreover, the pressure elements are disposed uniformly at the outer peripheral portion of the optical fiber, and dispersion in sensitivity in respective directions (and in the peripheral direction in particular) is suppressed.

In a third aspect of the present invention, the connecting wire of the load detecting device of the above-described first or second aspect is adhered to an outer peripheral surface of the optical fiber.

In the load detecting device based on the present aspect, the connecting wire is adhered to the outer peripheral surface of the optical fiber. Therefore, the spiral pitch of the connecting wire is maintained at a predetermined pitch. Thus, it is possible to prevent the position of the connecting wire from becoming offset in the optical fiber longitudinal direction when, for example, external pressure is applied or an applied external pressure is cancelled or the like.

In a fourth aspect of the present invention, the load detecting device of any of the above-described first through third aspects further comprises a cover member which is formed in a tubular shape and which covers the optical fiber in a state of making the connecting wire contact an inner surface of the cover member.

In the load detecting device based on the present aspect, the connecting wire is disposed in the space between the optical fiber and the cover member while being nipped between the optical fiber and the cover member. External force is transmitted to the optical fiber via the cover member and the connecting wire, and the optical fiber is deformed. In this way, because the cover member is provided, the optical fiber or the connecting wire does not directly abut a foreign object, or an object which is the object of the load detection.

Namely, the optical fiber and the connecting wire are protected, and reliability improves.

In a fifth aspect of the present invention, the connecting wire of the load detecting device of the above-described fourth aspect is held at an inner peripheral portion of the cover member.

In the load detecting device based on the present aspect, the connecting wire is held at the inner peripheral portion of the cover member in a state of forming a spiral form. Therefore, by inserting the optical fiber into the spiral formed by the connecting wire which is held at the cover member, it is possible to easily obtain a state in which the spiral connecting wire runs along the outer peripheral surface of the optical fiber.

In a sixth aspect of the present invention, the connecting wire of either of the above-described first or second aspects, which is wound around an outer peripheral surface of the optical fiber in a spiral form, is held at the optical fiber by a covering layer which fits tightly to the connecting wire and the optical fiber.

In the load detecting device based on the present aspect, the connecting wire is held at the outer periphery of the optical fiber by being tightly covered, together with the optical fiber, by the covering layer in a state in which the connecting wire is wound around the outer periphery of the optical fiber in a spiral form. Therefore, it is possible to prevent the position of the connecting wire from becoming offset in the optical fiber longitudinal direction when, for example, external pressure is applied or an applied external pressure is cancelled or the like.

Note that the covering layer may be, for example, a coating layer formed by coating or dipping, or a thermally contractible tube after thermal contraction, or the like.

In a seventh aspect of the present invention, the light-emitting means or the light-receiving means of any of the above-described first through sixth aspects is attached to a longitudinal direction end portion of the optical fiber.

In the load detecting device based on the present aspect, handling is easy because the light-emitting means or the light-receiving means is directly or indirectly attached to the optical fiber. Further, due to the light-emitting means or the light-receiving means being attached to the optical fiber, parts control and assembly are easy.

In particular, in a structure in which the light-emitting means and the light-receiving means are respectively attached to different longitudinal direction end portions of the optical fiber, the load detecting device can be handled overall as a single unit. The ability to handle the load detecting device, the ability to manage the parts thereof, the assemblability, and the like are improved.

In an eighth aspect of the present invention, the light-emitting means or the light-receiving means of the seventh aspect is attached to the longitudinal direction end portion of the optical fiber via a supporting member provided at the longitudinal direction end portion of the optical fiber.

In the load detecting device based on the present aspect, the light-emitting means or the light-receiving means is attached to a longitudinal direction end portion of the optical fiber via a supporting member. Namely, an end portion of the optical fiber and the light-emitting means or the light-receiving means are held by a supporting member. The position, the posture and the like of the light-emitting means or the light-receiving means with respect to the optical fiber can be maintained in an appropriate state by the supporting member.

Therefore, the position (posture) of the light-emitting means or the light-receiving means with respect to the longitudinal direction end portion of the optical fiber, i.e., the amount of incident light or the amount of received light, is stable, and reliability improves.

In a ninth aspect of the present invention, the light-emitting means or the light-receiving means of the eighth aspect is connected to the connecting wire via a connecting portion disposed on the supporting member.

In the load detecting device based on the present aspect, the connecting wire and the light-emitting means or the light-receiving means are connected via the connecting portion which is disposed on the supporting member. Therefore, connection of the connecting wire and the light-emitting means or the light-receiving means is easy. Further, the connecting wire is prevented from becoming unnecessarily long in order to be connected to the light-emitting means or the light-receiving means.

In particular, the present structure is suitably applied to cases in which the connecting wire and the light-emitting means or the light-receiving means are connected in a state in which the light-emitting means or the light-receiving means and the optical fiber are respectively held at a supporting member.

In a tenth aspect of the present invention, the supporting member of the eighth or ninth aspect has a grasping portion which nips and holds the longitudinal direction end portion of the optical fiber via the connecting wire.

In the load detecting device based on the present aspect, the longitudinal direction end portion of the optical fiber is held at the supporting member by being nipped by the grasping portion from the outer peripheral side via the connecting wire. In this way, the optical fiber, at which the connecting wire in a spiral form is positioned at the outer peripheral side thereof, can be reliably held by the supporting member with a simple structure.

In an eleventh aspect of the present invention, a region between a longitudinal direction end surface of the optical fiber and one of the light-emitting means and the light-receiving means of any of the above-described first through tenth aspects is sealed by a sealing agent which is light transmissive.

In the load detecting device based on the present aspect, a sealing agent seals the region between the end surface of the optical fiber and the light-emitting means or the light-receiving means. Therefore, entry of foreign matter, moisture, and the like into the region between the end surface of the optical fiber and the light-emitting means or the light-receiving means is prevented while the light transmittance of this region is maintained.

BRIEF DESCRIPTION OF THE DRAWINGS

FIG. 2A is a side sectional view showing, in an enlarged manner, a portion of a sensor main body which structures the pressure-sensitive sensor relating to the first embodiment of the present invention.

FIG. 2B is a sectional view orthogonal to the axial direction of the pressure-sensitive sensor of FIG. 2A.

FIG. 6 is a side view of the pressure-sensitive sensor relating to the second embodiment of the present invention.

FIG. 8A is a plan view showing an example in which the pressure-sensitive sensor relating to the embodiment of the present invention is applied as a collision sensor.

FIG. 8B is a sectional view taken along line 8B—8B of FIG. 8A.

DETAILED DESCRIPTION OF THE INVENTION

A pressure-sensitive sensor 10, which serves as a load detecting device relating to a first embodiment of the present invention, will be described on the basis of FIGS. 1 through 3.

Figure 1:
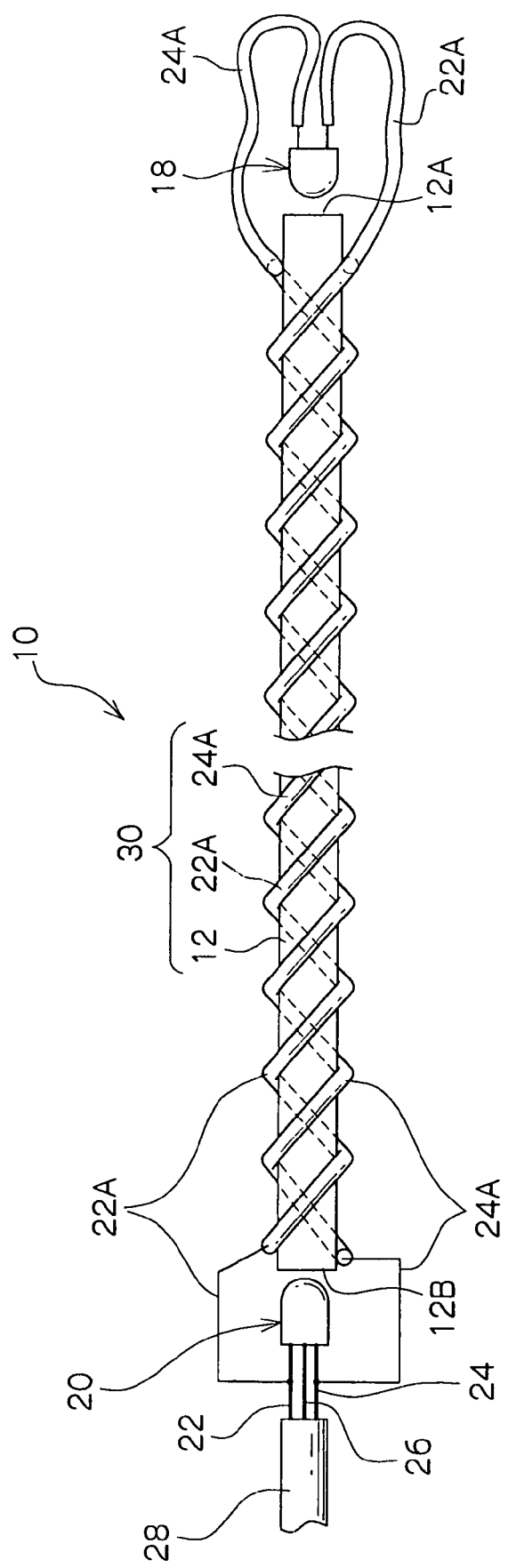
FIG. 1 is a side view showing the schematic overall structure of a pressure-sensitive sensor relating to a first embodiment of the present invention.

The schematic overall structure of the pressure-sensitive sensor 10 is shown in side view in FIG. 1. A portion of the internal structure of the pressure-sensitive sensor 10 is shown in an enlarged manner in the side sectional view of FIG. 2A. In FIG. 2B, the internal structure of the pressure-sensitive sensor 10 is shown in a sectional view orthogonal to the longitudinal direction. As shown in these drawings, the pressure-sensitive sensor 10 has an optical fiber 12.

The optical fiber 12 is structured by a core 14 which is long and solid-cylindrical, and a clad 16 which covers the outer peripheral portion of the core 14. The optical fiber 12 is formed overall in the shape of a solid cylinder having a predetermined length (i.e., an elongated solid cylinder). In the present first embodiment, the core 14 is formed from an elastic (flexible) material such as silicone rubber or the like, and the clad 16 is formed of a flexible material such as a fluorine resin or the like. In this way, the optical fiber 12 is flexible overall, and can be elastically deformed (restorably deformed) locally.

At the optical fiber 12, the refractive index of the clad 16 is lower than the refractive index of the core 14. The light, which is led in from a longitudinal direction one end portion 12A of the optical fiber 12, passes through toward another end portion 12B while being refracted at the border between the core 14 and the clad 16, and is led out from the other end portion 12B. Note that, for example, polytetrafluoroethylene or the like can be used as the fluorine resin forming the clad 16.

The above-described optical fiber 12 is structured such that the amount of light which passes through from the one end portion 12A to the other end portion 12B varies in accordance with the amount of deformation. Specifically, at the optical fiber 12, the greater the amount of deformation (i.e., the greater the external force causing deformation is), the greater the loss of the transmitted light, and the lower the amount of light which passes through from the one end portion 12A to the other end portion 12B.

Even in a case in which the optical fiber 12 receives a load of the same magnitude, the load being applied locally and the optical fiber 12 greatly deforming (caving-in) locally results in a higher transmission loss than in a case in which the load is applied over a wide range and the optical fiber 12 bendingly deforms.

Further, the pressure-sensitive sensor 10 has a light-emitting element 18 which is a light source which serves as a light-emitting means. The light-emitting element 18 is a light-emitting diode (LED) in the present first embodiment, and is disposed in a vicinity of the axial direction outer side of the one end portion 12A of the optical fiber 12. In this way, the light-emitting element 18 is disposed such that the light emitted therefrom can be incident at the core 14 which is exposed at the one end portion 12A of the optical fiber 12. The light-emitting element 18 is structured so as to emit light when energized. The wire for energizing the light-emitting element 18 will be described later.

The pressure-sensitive sensor 10 has a light-receiving element 20 which serves as a light-receiving means which is a light—electricity converting element which converts received light into an electrical signal. The light-receiving element 20 is disposed in a vicinity of the axial direction outer side of the other end portion 12B of the optical fiber 12, so as to receive the light which the light-emitting element 18 has emitted and which has passed through the optical fiber 12.

The light-receiving element 20 is a photodiode or a phototransistor which generates or amplifies electric current in accordance with the received light amount, or is a CdS cell (a cadmium sulfide cell) which can vary its own electrical resistance value in accordance with the received light amount, or the like.

Figure 3:
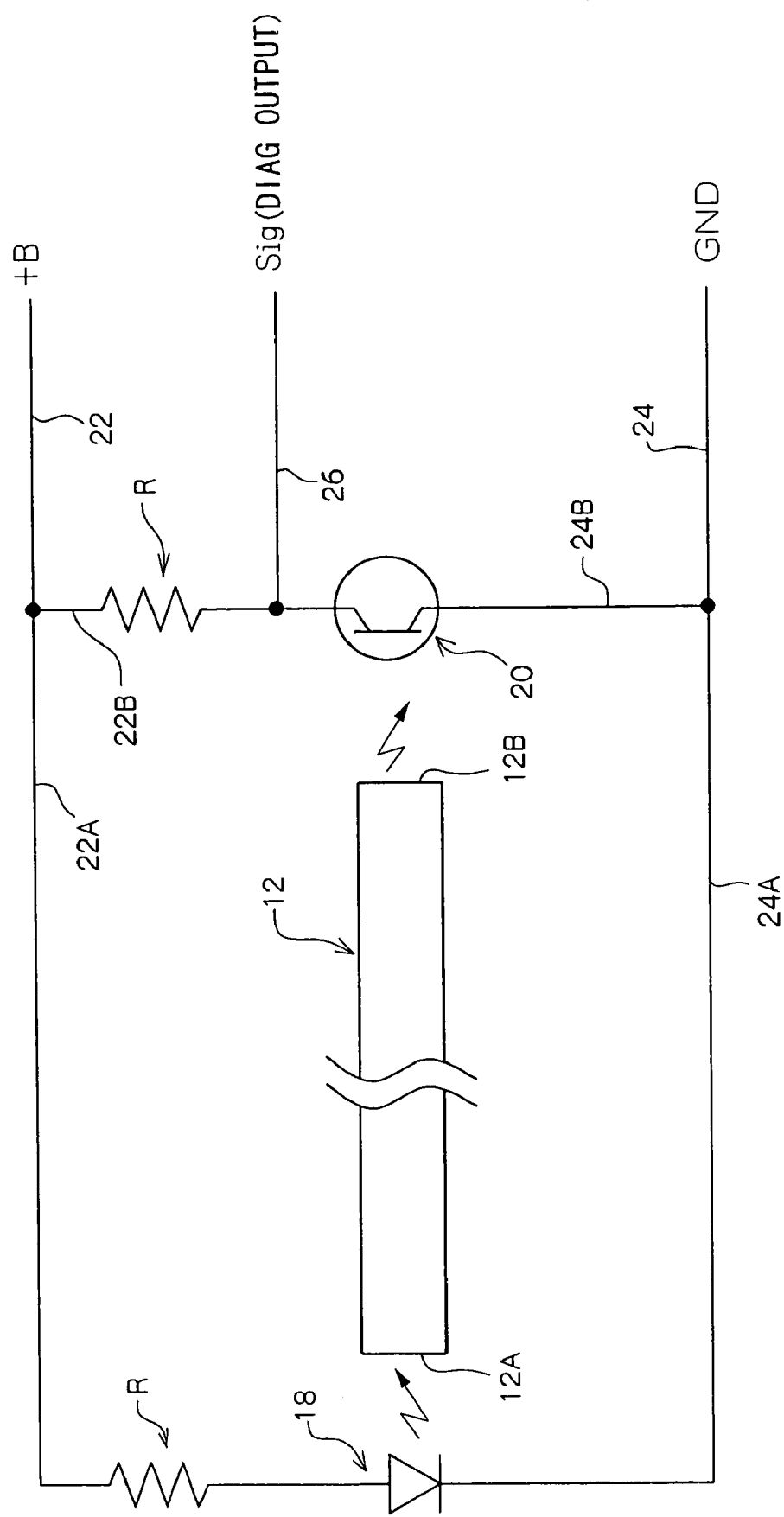
FIG. 3 is a schematic circuit diagram showing the electrical structure of the pressure-sensitive sensor relating to the first embodiment of the present invention.

The above-described light-emitting element 18 and light-receiving element 20 are electrically connected as shown in FIG. 3. Note that FIG. 3 illustrates an example in which a phototransistor is used as the light-receiving element 20. As shown in FIG. 3, the pressure-sensitive sensor 10 has a power source wire 22 which is connected to an external power source (not illustrated), and an ground wire 24 which is grounded at the exterior. The power source wire 22 and the ground wire 24 are covered conducting wires.

The power source wire 22 forks into a power source wire 22A for light-emission which is connected to the light-emitting element 18, and a power source wire 22B for light-reception which is connected to the light-receiving element 20. Similarly, the ground wire 24 forks into a ground wire 24A for light-emission which is connected to the light-emitting element 18, and a ground wire 24B for light-reception which is connected to the light-receiving element 20. The power source wire 22A for light-emission and the power source wire 22B for light-reception are connected to the light-emitting element 18 and the light-receiving element 20 respectively via resistors R which have predetermined electrical resistance values.

In this way, when an unillustrated switch between the power source wire 22 and the power source is closed, both the light-emitting element 18 and the light-receiving element 20 are energized (electricity is supplied thereto). The light-emitting element 18 emits light, and the light-receiving element 20 which is a phototransistor receives the light which has passed through the optical fiber 12 and amplifies the electric current in accordance with the amount of light received.

In the present first embodiment, the power source wire 22B for light-reception between the resistor R and the light-receiving element 20 forks off and a signal wire 26 is drawn out. The electrical potential difference between this signal wire 26 and the ground is the output signal (sensor signal). This output signal is inversely proportional to the amount of light received by the light-receiving element 20, i.e., the amount of deformation of the optical fiber 12 or the external force required for this deformation. The signal wire 26 is a covered conducting wire.

As shown in FIG. 1, the power source wire 22, the ground wire 24, and the signal wire 26 are covered in a state of being bundled together at the light-receiving element 20 side (the other end portion 12B side of the optical fiber 12), such that a wire harness 28 is formed. An unillustrated connector or the like is connected to the end portion of the wire harness 28.

The power source wire 22A for light-emission which is led out from the wire harness 28 is helically wound around the optical fiber 12 (the outer side of the clad 16) from the other end portion 12B of the optical fiber 12 to the one end portion 12A thereof, and is connected to the light-emitting element 18 via the resistor R (which is not shown in FIG. 1).

Similarly, the ground wire 24 for light-emission which is led out from the wire harness 28 is helically wound around the outer peripheral portion of the optical fiber 12 from the other end portion 12B of the optical fiber 12 to the one end portion 12A thereof, and is connected to the light-emitting element 18.

The power source wire 22A for light-emission and the ground wire 24A for light-emission are wound around the optical fiber 12 in parallel to one another. Namely, at the outer peripheral portion of the optical fiber 12, two spiral projecting portions, which function as pressure elements as will be described later, are formed by the power source wire 22A for light-mission and the ground wire 24A for light-emission.

The spiral pitch of the power source wire 22A for light-emission and the ground wire 24A for light-emission which form the pressure elements (i.e., the distance between the axial centers of the power source wire 22A for light-emission and the ground wire 24A for light-emission which are adjacent to one another in the longitudinal direction of the optical fiber 12) is preferably within the range of 2 mm to 30 mm, and concretely, is determined in accordance with the application of the pressure-sensitive sensor 10 and the wire diameter.

The outer diameters of the power source wire 22A for light-emission and the ground wire 24A for light-emission are equal to one another (substantially equivalent), and are preferably within the range of 0.1 times to 50 times the outer diameter of the core 14, and concretely, are determined in accordance with the application of the pressure-sensitive sensor 10.

The power source wire 22A for light-emission and the ground wire 24A for light-emission correspond to the "connecting wires" in the present invention. The portion structured by the power source wire 22A for light-emission and the ground wire 24A for light-emission, and the optical fiber 12 around which these wires are wound spirally (and contact or are extremely close to locally in the longitudinal direction) is called the sensor main body 30.

There may be a slight gap between, on the one hand, the power source wire 22A for light-emission and the ground wire 24A for light-emission, and, on the other hand, the outer peripheral portion of the optical fiber 12. However, in the present first embodiment, the power source wire 22A for light-emission and the ground wire 24A for light-emission are fixed to the outer peripheral portion of the optical fiber 12. Adhesion or depositing for example may be used as the method of fixing. In the present first embodiment, the fixing work utilizes simple adhesion.

Although not illustrated, the above-described pressure-sensitive sensor 10 is applied to a foreign object catching sensing device of a power window device, a motor-operated sliding door device, or a motor-operated back door device of a vehicle such as an automobile or the like. An output signal corresponding to the deformation of the sensor main body 30 (the optical fiber 12), i.e., the external force applied to the optical fiber 12, is outputted from the signal wire 26 to the foreign object catching sensing device as a diagnostic signal.

In a case in which that the diagnostic signal inputted from the pressure-sensitive sensor 10 is less than or equal to a threshold value set in advance, the foreign object catching sensing device judges that no catching of a foreign object has arisen.

On the other hand, when the diagnostic signal inputted from the pressure-sensitive sensor 10 has exceeded the aforementioned threshold value, i.e., when the optical fiber 12 is deformed due to catching of a foreign object and the amount of light transmitted through the optical fiber 12 decreases by more than a predetermined range due to the transmission loss, the foreign object catching sensing device judges that catching of a foreign object has occurred.

The (catching judging function of the) foreign object catching sensing device may be incorporated into, for example, (the ECU of) the control device of a power window device, a motor-operated sliding door device, or a motor-operated back door device, or may be incorporated into the pressure-sensitive sensor 10, or may be incorporated into an abnormality detecting ECU which consolidates the detection of abnormalities of the vehicle.

Further, the foreign object catching sensing device can sense that trouble has arisen, such as there has been breakage of a wire at the pressure-sensitive sensor 10 or the like, by detecting that the diagnostic signal inputted from the pressure-sensitive sensor 10 has risen to the power source voltage (a value which is lowered by the resistor R), or has fallen to 0 voltage, i.e., by detecting that the diagnostic signal has either exceeded a second threshold value or fallen below a third threshold value.

Note that, in a case in which the foreign object catching sensing device is to detect that a foreign object has become caught between a side window sash and a side window glass which opens and closes a side window by a power window device, the sensor main body 30 of the pressure-sensitive sensor 10 is disposed, for example, at the lower end of the garnish in the vicinity of the weather stripping along the longitudinal direction of the garnish.

Further, in a case in which the catching of a foreign object between the B pillar and a sliding door driven by a motor-operated sliding door device is to be detected, the sensor main body 30 is disposed, for example, with its longitudinal direction running along the vertical direction at the end portion of the sliding door which end portion faces toward the B pillar.

Moreover, in a case in which the catching of a foreign object between the rear gate and the back door which is driven by a motor-operated back door device is to be detected, the sensor main body 30 is disposed, for example, with its longitudinal direction running along the vertical direction at the both side portions of the back door which oppose the rear gate.

Next, operation of the present first embodiment will be described.

When electricity is supplied via the power source wire 22 to the pressure-sensitive sensor 10 having the above-described structure, the light-emitting element 18 emits light, and this light is incident at the optical fiber 12 from the one end portion 12A thereof. This light, while being refracted at the border between the core 14 and the clad 16, passes through the interior of the core 14, and exits from the other end portion 12B and is received at the light-receiving element 20. The light-receiving element 20, which has received this light, outputs, from the signal wire 26, an output signal corresponding to (inversely proportional to) the amount of light received. The above operations are always carried out while electricity is being supplied.

The output signal from the signal wire 26 is inputted to the foreign object catching sensing device. The foreign object catching sensing device compares the magnitude of the output signal with a threshold value which has been set in advance.

Then, if there is no catching of a foreign object between the side window glass and the side window sash, or between the sliding door and the B pillar, or between the back door and the rear gate, the output signal of the pressure-sensitive sensor 10 is less than or equal to the threshold value set at the foreign object catching sensing device, and the foreign object catching sensing device judges that no catching of a foreign object has arisen.

On the other hand, if a foreign object is caught between the side window glass and the side window sash (the garnish), or between the sliding door and the B pillar, or between the back door and the rear gate, the pressure applied accompanying this catching is applied to the sensor main body 30 mounted to the garnish, the sliding door, or the back door. Due to this pressing force, deformation arises at the optical fiber 12 structuring the sensor main body 30. Thus, at the pressure-sensitive sensor 10, the transmission loss of the light at the optical fiber 12 becomes large, and the amount of light received at the light-receiving element 20 decreases suddenly (within a short period of time). Therefore, the output signal outputted from the signal wire 26 suddenly increases.

Then, at the foreign object catching sensing device to which this output signal (diagnostic signal) is inputted, if the magnitude of the output signal exceeds the threshold value, it is judged that catching of a foreign object has arisen. In this case, the foreign object catching sensing device, for example, outputs, to the power window device, the power sliding door device, or the motor-operated back door device to which the foreign object catching sensing device is applied, a catch release command signal for stopping or reversely driving the driving motor structuring the power window device, the power sliding door device, or the motor-operated back door device.

Here, the sensor main body 30 is structured by the power source wire 22A for light-emission and the ground wire 24A for light-emission respectively being wound spirally around the outer peripheral portion of the optical fiber 12. Therefore, in a case in which external force is applied due to the sensor main body 30 being pressed by a relatively large object (an object which is large along the longitudinal direction) such as the hand or the arm of a person or the like, that pressing force is transmitted to the optical fiber 12 via the power source wire 22A for light-emission or the ground wire 24A for light-emission positioned locally in the longitudinal direction of the optical fiber 12.

In this way, this pressing force is not applied substantially uniformly to the optical fiber 12 along a given range in the longitudinal direction, but rather, the portion which is pushed via the power source wire 22A for light-emission or the ground wire 24A for light-emission locally deforms greatly. Note that, when local deformation arises, the transmission loss of the optical fiber 12 is greater than in a case in which there is deformation over a wide range. Therefore, due to the power source wire 22A for light-emission or the ground wire 24A for light-emission being made to function as a pressure element and greatly deforming the optical fiber 12 locally, the sensitivity of detecting the deformation, i.e., the load, improves.

Therefore, when the pressure-sensitive sensor 10 is applied to a foreign object catching sensing device, at the stage when the pressing force which is applied to the sensor main body 30 accompanying the catching of a foreign object is small, i.e., at the initial stage of the catching, the catching can be sensed, and the ability to protect the object which is being caught, such as the hand or the arm of a person or the like, can be improved.

In this way, the pressure-sensitive sensor 10 relating to the present first embodiment has good sensitivity, and is compact because it does not have any parts which can move with respect to the optical fiber 12.

In the pressure-sensitive sensor 10, the power source wire 22A for light-emission and the ground wire 24A for light-emission, which are for conduction to the light-emitting element 18, function as pressure elements. Therefore, the aforementioned improvement in sensitivity can be realized without increasing the number of parts.

Further, the power source wire 22A for light-emission and the ground wire 24A for light-emission which are wound spirally around the outer periphery of the optical fiber 12 do not impede the bending of the optical fiber 12. Thus, they can be mounted to regions where the sensor main body 30 is curved (e.g., the edge of the garnish or the like) in a state of being deformed along the configuration of this curving, and can detect external force which bendingly deforms the sensor main body 30.

Both of the power source wire 22A for light-emission and the ground wire 24A for light-emission, which are needed in order to make the light-emitting element 18 emit light, are wound around the optical fiber 12 from the one end portion 12A to the other end portion 12B. Thus, the wires of the pressure-sensitive sensor 10 which connect to the exterior are concentrated at one longitudinal direction side of the sensor main body 30. Namely, the wire harness 28 is provided only at one longitudinal direction side, and the pressure-sensitive sensor 10 which has excellent management and placeability is realized.

The two spiral-shaped protruding portions which function as the pressure elements are formed by the power source wire 22A for light-emission and the ground wire 24A for light-emission. Therefore, the pressure elements can be disposed at substantially uniform intervals in the longitudinal direction and the peripheral direction at the outer peripheral portion of the optical fiber 12. The sensitivity can be made to be substantially uniform with respect to the direction in which the load is applied. Moreover, because the power source wire 22A for light-emission and the ground wire 24A for light-emission are substantially the same length, the electrical characteristics are stable.

The power source wire 22A for light-emission and the ground wire 24A for light-emission are respectively adhered to the outer peripheral portion of the optical fiber 12. Thus, the pitches of the spirals of and the intervals between the power source wire 22A for light-emission and the ground wire 24A for light-emission can be maintained at predetermined values. Therefore, it is possible to prevent the positions of the power source wire 22A for light-emission and the ground wire 24A for light-emission from being offset in the longitudinal direction of the optical fiber 12 when, for example, external pressure is applied or an applied external pressure is cancelled or the like.

Next, a modified example of the sensor main body in the pressure-sensitive sensor 10 relating to the first embodiment of the present invention will be described. Note that the same reference numerals as in the above-described first embodiment are applied to parts and portions which are basically the same as those of the first embodiment, and description thereof is omitted.

Figure 4:
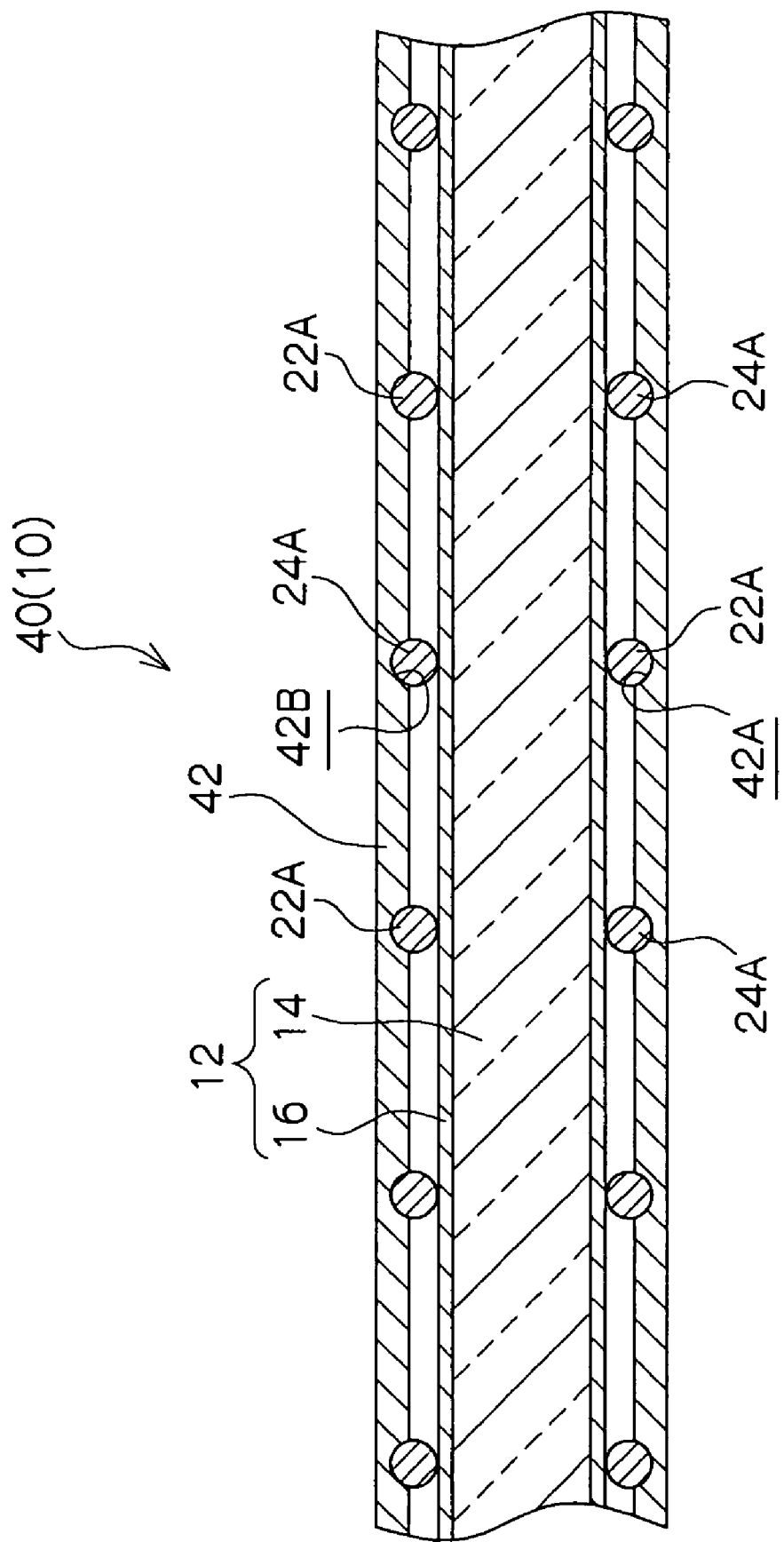
FIG. 4 is a side sectional view corresponding to FIG. 2 and showing a modified example of the sensor main body which structures the pressure-sensitive sensor relating to the first embodiment of the present invention.

A portion of a sensor main body 40 relating to the modified example is shown in an enlarged manner in a side sectional view in FIG. 4. As shown in FIG. 4, the sensor main body 40 differs from the sensor main body 30 in that the sensor main body 40 has a cover member 42 which covers the optical fiber 12 from the outer peripheral side thereof.

The cover member 42 is formed as a long, plastic tube of a flexible material such as rubber or elastomer or the like. Two spiral grooves 42A, 42B are formed over the entire length at the inner peripheral portion of the cover member 42. A radial direction portion of the power source wire 22A for light-emission is fit into (embedded into) the spiral groove 42A, and a radial direction portion of the ground wire 24A for light-emission is fit into the spiral groove 42B.

In this way, the power source wire 22A for light-emission and the ground wire 24A for light-emission are held by the cover member 42 while forming coaxial spiral configurations. The optical fiber 12 is inserted in (fit-together) at the interior of the two spirals formed by the power source wire 22A for light-emission and the ground wire 24A for light-emission.

When this sensor main body 40 is manufactured, the cover member 42, which holds the power source wire 22A for light-emission and the ground wire 24A for light-emission which form the spiral configurations, is manufactured by a known method, and is cut to a length for forming the sensor main body 40. Thereafter, the optical fiber 12 of substantially the same length is inserted into the spirals formed by the power source wire 22A for light-emission and the ground wire 24A for light-emission held within the cut cover member 42, and, as needed, is subjected to processing for preventing the optical fiber 12 from coming out (adhesion may be carried out in the same way as with the sensor main body 30).

The light-emitting element 18 and the light-receiving element 20 are attached to the sensor main body 40 which is manufactured in this way, and electrical connection is carried out as shown in FIG. 3. In this way, the pressure-sensitive sensor 10 having the sensor main body 40 relating to the modified example is manufactured easily.

The exact same effects as in the above-described first embodiment are obtained by the structure having the sensor main body 40 relating to the present modified example. Further, in the pressure-sensitive sensor 10 equipped with the sensor main body 40, because the cover member 42 is provided, the power source wire 22A for light-emission, the ground wire 24A for light-emission, and the optical fiber 12 are protected by the cover member 42.

Namely, the power source wire 22A for light-emission, the ground wire 24A for light-emission, and the optical fiber 12 are covered by the cover member 42, and do not directly abut the foreign object or the object of the nipping, or the structure which the object is being nipped against (e.g., the B pillar with respect to the sliding door, or the like), or the like, and are protected from damage, breakage and the like. In this way, the reliability of the pressure-sensitive sensor 10 having the sensor main body 40 is improved.

Further, the power source wire 22A for light-emission and the ground wire 24A for light-emission, which are wound in spiral forms around the outer peripheral portion of the optical fiber 12, are covered by the cover member 42 and cannot be seen from the exterior. Therefore, the sensor main body 40, i.e., the pressure-sensitive sensor 10, has a streamlined exterior and an attractive appearance.

The power source wire 22A for light-emission and the ground wire 24A for light-emission form spiral forms while being held by the cover member 42. Therefore, the sensor main body 40 which exhibits the above-described effects can be easily obtained by the optical fiber 12 being inserted or fit within the spirals formed by the power source wire 22A for light-emission and the ground wire 24A for light-emission.

SECOND EMBODIMENT

Next, a pressure-sensitive sensor 50 serving as a load detecting device relating to a second embodiment of the present invention will be described on the basis of FIGS. 5 through 8A and 8B. Note that parts and portions which are basically the same as those of the above-described first embodiment are denoted by the same reference numerals as in the first embodiment, and description thereof is omitted.

Figure 5:
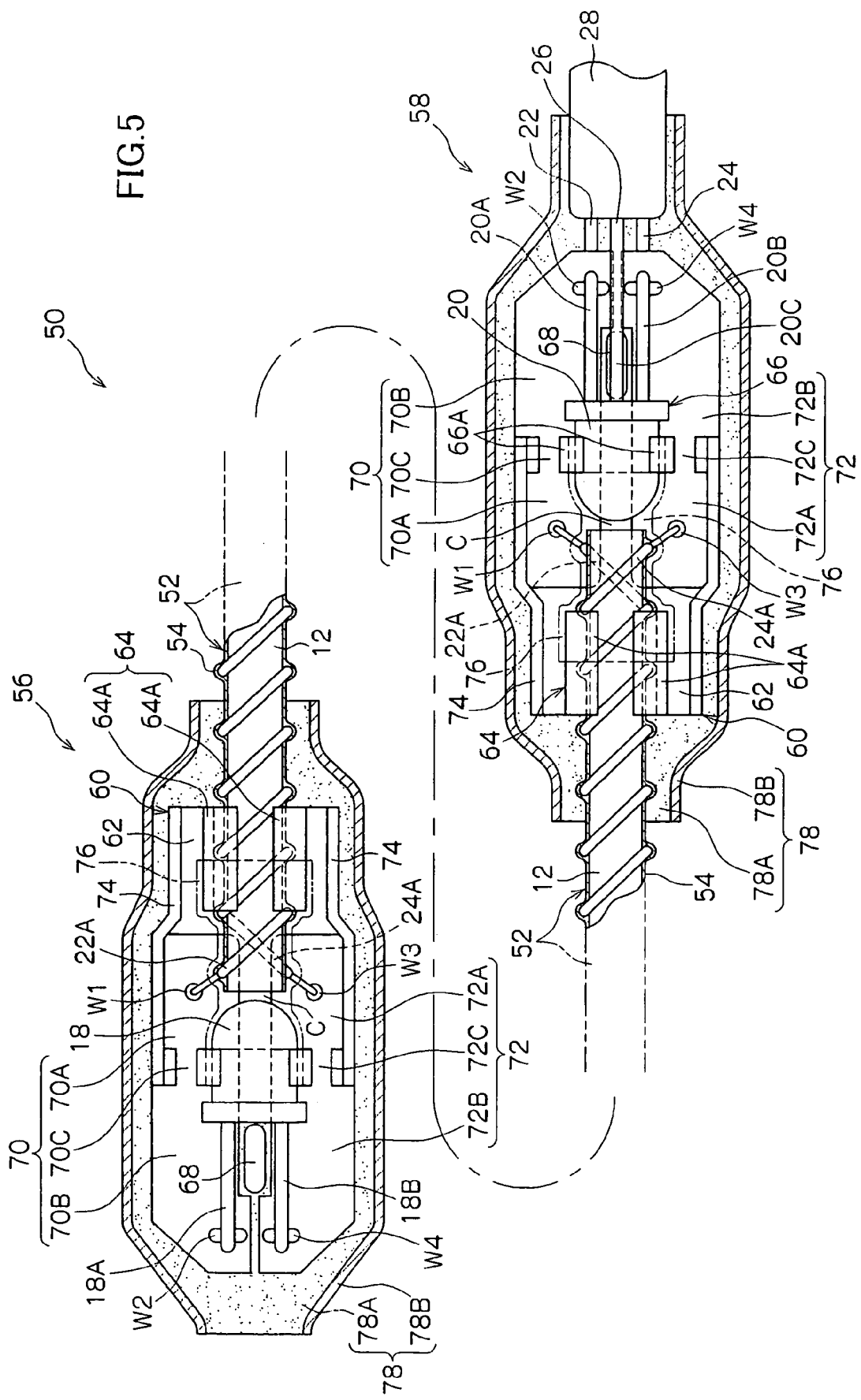
FIG. 5 is a side sectional view showing the schematic overall structure of a pressure-sensitive sensor relating to a second embodiment of the present invention.

The schematic overall structure of the pressure-sensitive sensor 50 is shown in sectional view in FIG. 5. The pressure-sensitive sensor 50 is shown in side view in FIG. 6. As shown in these figures, the pressure-sensitive sensor 50 has the optical fiber 12 around which the power source wire 22A for light-emission and the ground wire 24A for light-emission are wound in spiral forms, the light-emitting element 18, and the light-receiving element 20. The pressure-sensitive sensor 50 is electrically structured exactly the same as the pressure-sensitive sensor 10 (see FIG. 3), and is the same as the pressure-sensitive sensor 10 with regard to the point that the power source wire 22A for light-emission and the ground wire 24A for light-emission improve the sensitivity of load detection by the deformation of the optical fiber 12.

The pressure-sensitive sensor 50 has, instead of the sensor main body 30, a sensor main body 52. The sensor main body 52 is structured by the power source wire 22A for light-emission and the ground wire 24A for light-emission, which are spirally wound around the outer periphery of the optical fiber 12, being covered, together with the optical fiber 12, by a surface coating layer 54 which serves as a covering layer.

The surface coating layer 54 is structured by coating or dipping or the like so as to cover the exposed surfaces of the outer peripheral sides of the optical fiber 12, the power source wire 22A for light-emission and the ground wire 24A for light-emission by being tightly fit thereto. The surface coating layer 54 exhibits the function of protecting the optical fiber 12, the power source wire 22A for light-emission and the ground wire 24A for light-emission from damage or breakage or the like, and the function of holding the power source wire 22A for light-emission and the ground wire 24A for light-emission at the outer periphery of the optical fiber 12.

The pressure-sensitive sensor 50 is structured such that a light-emitting portion 56 and a light-receiving portion 58 are provided at the longitudinal direction end portions of the sensor main body 52, and is structured so as to be able to be handled on the whole as a single unit (module). Hereinafter, the light-emitting portion 56 will be described first. Portions of the light-receiving portion 58 which are basically the same as those in the light-emitting portion 56 are denoted by the same reference numerals as in the light-emitting portion 56, and description thereof is omitted. Description of the light-receiving portion 58 will mainly focus on the portions thereof which differ from the light-emitting portion 56.

The light-emitting portion 56 has a terminal holder 60 which serves as a supporting member. The terminal holder 60 is formed of a resin material such as, for example, phenol resin or polybutylene terephthalate (PBT) or the like, and is electrically insulating. The terminal holder 60 has a floor plate portion 62 which is substantially shaped as a rectangular flat plate. A sensor clamp 64 stands erect along the direction of plate thickness from one longitudinal direction end side of the floor plate portion 62.

Figure 7A:
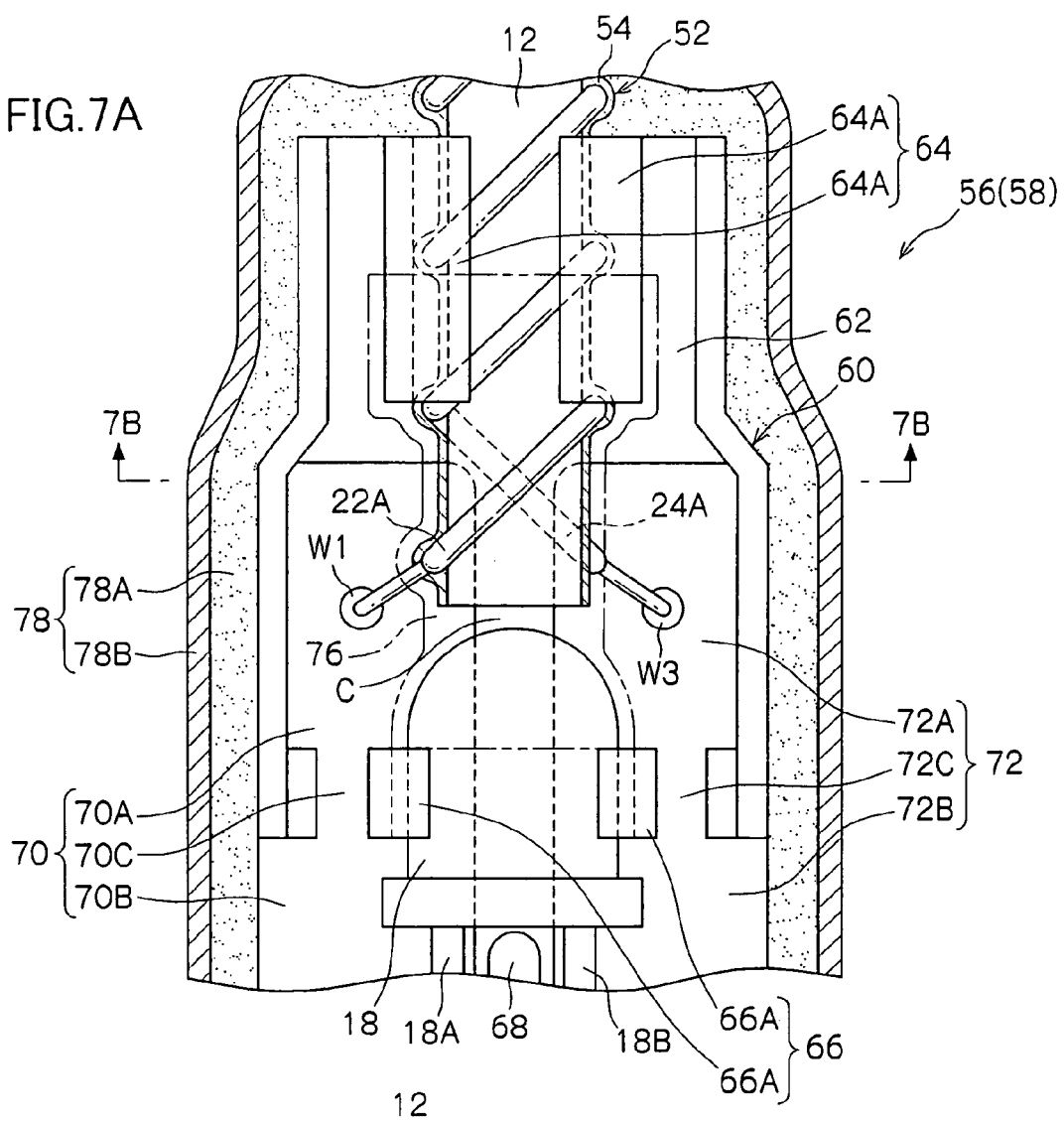
FIG. 7A is a side sectional view showing, in an enlarged manner, a portion of the pressure-sensitive sensor relating to the second embodiment of the present invention.
Figure 7B:
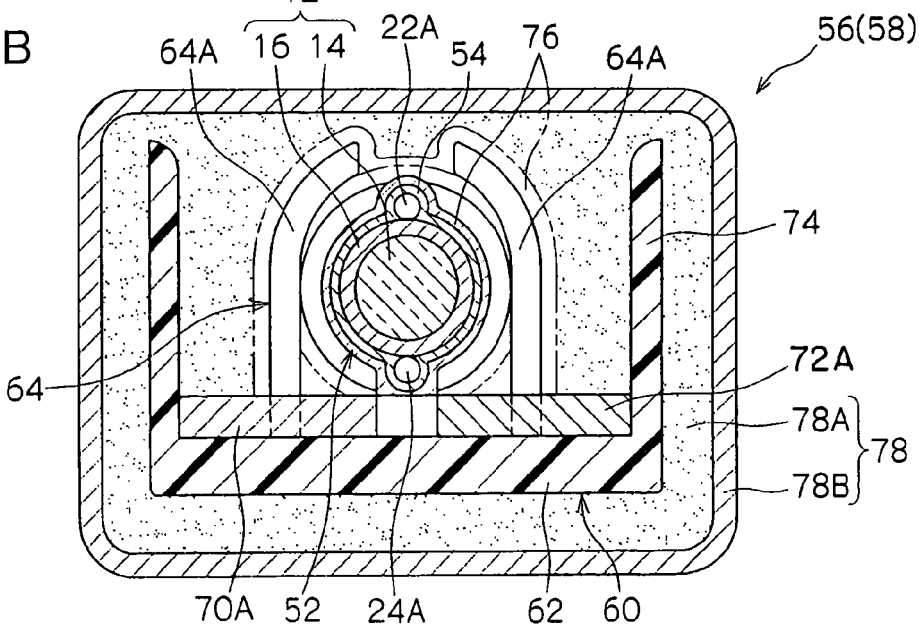
FIG. 7B is a sectional view taken along line 7B—7B of FIG. 7A.

As shown in FIGS. 7A and 7B as well, at the sensor clamp 64, a longitudinal direction end portion of the sensor main body 52 is nipped between a pair of clamp pieces 64A such that the end portion of the sensor main body 52 is grasped (held) elastically.

Namely, the sensor clamp 64 is structured such that the optical fiber 12 is nipped-in between the pair of clamp pieces 64A via the surface coating layer 54, the power source wire 22A for light-emission and the ground wire 24A for light-emission.

An element clamp 66 projects from the floor plate portion 62 of the terminal holder 60. The element clamp 66 holds the light-emitting element 18 between a pair of clamp pieces 66A. In the state of being held by the element clamp 66, the light-emitting element 18 is disposed such that the light emitted therefrom can be incident at the core 14 which is exposed at the one end portion 12A of the optical fiber 12. In this state, the distal end of the sensor main body 52 projects further toward the light-emitting element 18 than the sensor clamp 64, and a slight gap C is set between the light-emitting element 18 and (the core 14 exposed at) the one end portion 12A side end surface of the optical fiber 12.

A stopper wall 68 projects from the floor plate portion 62 at the side of the light-emitting element 18 opposite the side at which the sensor main body 52 is disposed. The stopper wall 68 restricts movement of the light-emitting element 18 away from the sensor main body 52.

A pair of power supplying terminals 70, 72 serving as connecting portions are held at the terminal holder 60. The power supplying terminals 70, 72 are formed in the shapes of flat plates of a material having good electrical conductivity and weldability (including brazing and soldering), such as, for example, metal plates in which tin is plated on copper plates or the like.

The power supply terminals 70, 72 are structured to have, respectively: wire connecting portions 70A, 72A mainly positioned further toward the sensor main body 52 than the light-emitting element 18; element connecting portions 70B, 72B mainly positioned at the side of the light-emitting element 18 opposite the side at which the wire connecting portions 70A, 72A are disposed; and joining portions 70C, 72C which join the wire connecting portions 70A, 72A and the element connecting portion 70B, 72B at the side of the light-emitting element 18, respectively.

These power supply terminals 70, 72 are disposed, so as to not contact one another, at the inner sides of vertical walls 74 which stand erect along the longitudinal direction from both side portions of the terminal holder 60.

In the present second embodiment, the power supply terminals 70, 72 are held such that they do not contact one another, by the pair of clamp pieces 66A, which are positioned so as to be able to engage with the transverse direction inner sides of the joining portions 70C, 72C respectively, and by the stopper wall 68, which is positioned so as to be able to engage between the element connecting portions 70B, 72B.

Note that the respective power supply terminals 70, 72 may be held at the terminal holder 60 by caulking or adhesion, or may be formed integrally with the terminal holder 60 by insert molding.

As shown in FIG. 5, at the power supply terminal 70, an end portion of the power source wire 22A for light-emission is joined in an electrically conductive state to the wire connecting portion 70A by welding (welded portion W1), and a power source side terminal 18A of the light-emitting element 18 is joined in an electrically conductive state to the element connecting portion 70B by welding (welded portion W2).

At the power supply terminal 72, an end portion of the ground wire 24A for light-emission is joined in an electrically conductive state to the wire connecting portion 72A by welding (welded portion W3), and a ground side terminal 18B of the light-emitting element 18 is joined in an electrically conductive state to the element connecting portion 72B by welding (welded portion W4). The resistor R at the power source wire 22A for light-emission side is integrated within the light-emitting element 18.

In this way, the light-emitting element 18 is structured so as to be connected to the power source wire 22A for light-emission and the ground wire 24A for light-emission via the pair of power supply terminals 70, 72, such that electricity can be supplied to the light-emitting element 18.

Note that the respective welded portions WI through W4 may be structured so as to bear (or bear a portion of) the strength of mounting the sensor main body 52 and the light-emitting element 18 to the terminal holder 60 via the power supply terminals 70, 72. In this case as well, it is preferable to provide, at the terminal holder 60, the sensor clamp 64 and the element clamp 66 which have the function of urging and holding the sensor main body 52 and the light-emitting element 18, respectively, with respect to the terminal holder 60 (i.e., the function of maintaining the positional relationship therebetween).

Printed substrates for example may be used as the power supply terminals 70, 72. In this case, the resistor R can be packaged on the power supply terminal 70.

Further, at the light-emitting portion 56, the aforementioned gap C between the light-emitting element 18 and (the end surface of the core 14 exposed at) the longitudinal direction end surface of the sensor main body 52 is sealed by a sealing agent 76. The sealing agent 76 is formed of a light transmitting material such as, for example, a transparent synthetic resin having a UV cutting function, or the like. The sealing agent 76 is applied from an end portion of the sensor main body 52 (a portion of the sensor clamp 64) to a portion of the light-emitting element 18 at the sensor main body 52 side, so as to fill in the gap C. The sealing agent 76 prevents the entry of foreign matter or moisture of the like into the gap C, while maintaining the light transmittance of the gap C.

In the present second embodiment in which the light-emitting portion 56 has a covering portion 78 which will be described later, the sealing agent 76 functions to prevent a watertight agent (which will be described later) from entering into the gap C and the light transmittance from deteriorating.

The light-emitting portion 56 is structured so as to be covered overall in a sealed state by the covering portion 78. In the present second embodiment, the covering portion 78 is structured by an inner layer 78A which is formed of a watertight agent such as polyamide resin or the like, and a casing 78B which is formed of olefin resin or the like and covers the inner layer 78A. The inner layer 78A tightly seals the end portion of the sensor main body 52, the light-emitting element 18, the terminal holder 60 and the power supply terminals 70, 72, which are covered by the covering portion 78, and prevents entry of water and the like into the light-emitting portion 56.

As described above, the covering portion 78 can be structured by, for example, two layers of thermally-contractible tubes. Note that the covering portion 78 is not limited to a two-layer structure, and may be structured, for example, as a single layer of a thermoplastic resin material molded by hot melt molding, such as a polyamide material, a polypropylene material, a silicone material, or the like.

On the other hand, the light-receiving portion 58 is structured such that the end portion of the sensor main body 52, which end portion is at the other end portion 12B side of the optical fiber 12, is grasped by the sensor clamp 64 of the terminal holder 60, and the element clamp 66 is structured to hold the light-receiving element 20. The light-receiving element 20 has a signal terminal 20C, in addition to power source side terminals 20A, 20B which are connected to the power supply terminals 70, 72, respectively.

At the light-receiving portion 58, the power source wire 22 and the ground wire 24 are connected to the power supply terminals 70, 72, respectively, and the signal wire 26 is connected to the signal terminal 20C. At the light-receiving portion 58, the wire harness 28, in which the power source wire 22, the ground wire 24, and the signal wire 26 are bundled together, are led out to the exterior of the covering portion 78 from the side opposite the sensor main body 52.

The other structures of the light-receiving portion 58 are basically similar to the corresponding structures at the light-emitting portion 56. Accordingly, in the pressure-sensitive sensor 50 relating to the present second embodiment, similar effects as those of the above-described pressure-sensitive sensor 10 can be obtained, except for the effect achieved by the light-emitting side power source wire 22A (the power source wire 22A for light-emission) and the light-emitting side ground wire 24A (the ground wire 24A for light-emission) being adhered to the optical fiber 12. Further, the following effects are obtained by the pressure-sensitive sensor 50.

First, because the light-emitting side power source wire 22A and the light-emitting side ground wire 24A are held by the surface coating layer 54 at the outer periphery of the optical fiber 12, the pitches between the spirals of and the intervals between the power source wire 22A for light-emission and the ground wire 24A for light-emission can be maintained at predetermined values. Therefore, it is possible to prevent the positions of the power source wire 22A for light-emission and the ground wire 24A for light-emission from being offset in the longitudinal direction of the optical fiber 12 when, for example, external pressure is applied or an applied external pressure is cancelled or the like.

Moreover, because the power source wire 22A for light-emission, the ground wire 24A for light-emission, and the optical fiber 12 are covered by the surface coating layer 54, they are protected from damage, breakage and the like caused by abutment with a foreign object or the like. In this way, the reliability of the pressure-sensitive sensor 50 having the sensor main body 52 is improved.

At the pressure-sensitive sensor 50, the light-emitting element 18 and the light-receiving element 20 are mounted to the respective longitudinal direction end portions of the optical fiber 12. Namely, the light-emitting portion 56 and the light-receiving portion 58 are mounted to the respective longitudinal direction ends of the sensor main body 52. Therefore, the pressure-sensitive sensor 50 can, on the whole, be treated as a single sensor unit (assembly). As a result, parts control and the ability to assemble the pressure-sensitive sensor 50 to a vehicle are good.

The light-emitting element 18 and the light-receiving element 20 are attached to the longitudinal direction end portions of the optical fiber 12 via the terminal holders 60, respectively. Thus, the light-emitting element 18 and the light-receiving element 20 are held at proper positions, postures and the like with respect to the optical fiber 12.

In this way, the position (posture) of the light-emitting element 18 or the light-receiving element 20 with respect to the longitudinal direction end portion of the optical fiber 12, i.e., the amount of incident light or the amount of received light, is stable, and the reliability of the pressure-sensitive sensor 50 is improved.

In particular, at the terminal holder 60, the sensor clamp 64, which is formed from the pair of clamp pieces 64A, nips and grasps the sensor main body 52. Therefore, the sensor main body 52, at which the spiral pressure elements are formed at the outer periphery of the optical fiber 12, can be reliably held at the terminal holder 60 by a simple structure.

The light-emitting side power source wire 22A and the light-emitting side ground wire 24A are connected to the light-emitting element 18 and the light-receiving element 20 via the power supply terminals 70, 72 held at the terminal holders 60. Thus, for example, in a structure in which the light-emitting portion 56 and the light-receiving portion 58 are provided at the end portions of the sensor main body 52, it is easy to connect, on the one hand, the light-emitting side power source wire 22A, the light-emitting side ground wire 24A, and, on the other hand, the light-emitting element 18, the light-receiving element 20.

At the pressure-sensitive sensor 50, the gaps C between, on the one hand, the light-emitting element 18, the light-receiving element 20, and, on the other hand, the end surfaces of the optical fiber 12, are sealed by the sealing agents 76. Thus, a structure in which the entry of foreign matter, water and the like is prevented while the light transmittance of the gaps C is maintained is realized. It is thereby possible to prevent the amount of light received at the light-receiving element 20 from decreasing due to foreign matter or the like which has entered into the gap C.

Next, as an example of the pressure-sensitive sensor 10, 50 being applied to a structure other than a foreign object catching sensing device, the case of the pressure-sensitive sensor 50 will be described on the basis of FIGS. 8A and 8B. In this example, the pressure-sensitive sensor 50 is mounted to a front bumper 80 of a vehicle such as an automobile or the like, and is applied as a collision sensor, and senses a vehicle collision. Details will be described hereinafter.

The front bumper 80 is structured by a bumper skeleton member 80A which is connected to a vehicle structural body 82 and whose longitudinal direction runs along the transverse direction of the vehicle; a bumper cover 80B which covers the bumper skeleton member 80A from the front side (the side in the direction of arrow A shown in FIGS. 8A and 8B); and a foamed material 80C filled in between the bumper skeleton member 80A and the bumper cover 80B. The both longitudinal direction end portions of the bumper cover 80B are curved so as to curve in at the respective sides.

Note that the region between the bumper skeleton member 80A and the bumper cover 80B may be a hollow structure, without the foamed material 80C being filled therein.

The sensor main body 52 of the pressure-sensitive sensor 50 is fixed to the front surface of the bumper skeleton member 80A. The light-emitting portion 56 and the light-receiving portion 58 are mounted to the respectively opposite longitudinal direction end portions of the bumper skeleton member 80A (the aforementioned curved portions which curve in at the respective sides). The signal wire 26 of the pressure-sensitive sensor 50 is connected to a collision detecting ECU 84 of the vehicle. An output signal corresponding to the amount of light received by the light-receiving element 20 is outputted from the signal wire 26 to the collision detecting ECU 84 as a diagnostic signal.

When the diagnostic signal inputted from the pressure-sensitive sensor 50 is less than or equal to a threshold value set in advance, the collision detecting ECU 84 judges that a collision has not arisen.

On the other hand, when the diagnostic signal inputted from the pressure-sensitive sensor 50 exceeds the aforementioned threshold value, i.e., when the optical fiber 12 (the sensor main body 52) is deformed by a vehicle collision (a front collision) and the amount of light transmitted through the optical fiber 12 decreases by more than a predetermined range due to the transmission loss, the collision detecting ECU 84 judges that a front collision has occurred.

The collision detecting ECU 84 which judges that a front collision has occurred outputs a collision signal to, for example, an air bag device, a seat belt device, a brake device, or the like. The collision detecting ECU 84 may be built into the respective control devices (ECUs) controlling the aforementioned respective devices, or may be built into a control device which collectively controls the safety of the vehicle.

In the same way as the case of the pressure-sensitive sensor 10, the collision detecting ECU 84 can sense, on the basis of the signal from the signal wire 26, that a problem such as wire breakage or the like has arisen at the pressure-sensitive sensor 50.

At the pressure-sensitive sensor 50, spiral pressure elements are formed at the outer periphery of the optical fiber 12 by the light-emitting side power wire 22A and the light-emitting side ground wire 24A being wound in respective spiral forms around the outer periphery of the optical fiber 12. Therefore, the impact accompanying the collision to the bumper cover 80B is inputted locally to the optical fiber 12 via the foamed material 80C and the light-emitting side power source wire 22A or the light-emitting side ground wire 24A, and the vehicle collision can be reliably detected. In particular, the accuracy of detecting a relatively weak collision is good.

Accordingly, when the pressure-sensitive sensor 10 having the sensor main body 30 or the sensor main body 40 is applied to a collision sensor, the exact same effects can be obtained.

Moreover, as a collision sensor applied to a vehicle such as an automobile or the like, it goes without saying that, for example, the pressure-sensitive sensor 10, 50 may be mounted to a rear bumper and serve as a rear collision sensor, or the pressure-sensitive sensor 10, 50 may be mounted to the door or the side sill of a vehicle and serve as a side collision sensor.

The above-described embodiments and modified example describe preferable structures in which two spiral projecting portions are formed at the outer peripheral portion of the optical fiber 12 by the power source wire 22A for light-emission and the ground wire 24A for light-emission. However, the present invention is not limited to the same. For example, a spiral projecting portion may be formed at the outer peripheral portion of the optical fiber 12 by only one of the power source wire 22A for light-emission and the ground wire 24A for light-emission. Or, the wire harness 28 may be taken out from the one end portion 12A side, whereby three spiral projecting portions may be formed at the outer peripheral portion of the optical fiber 12 by the power source wire 22B for light-reception, the ground wire 24B for light-reception, and the signal wire 26.

Figure 9A:
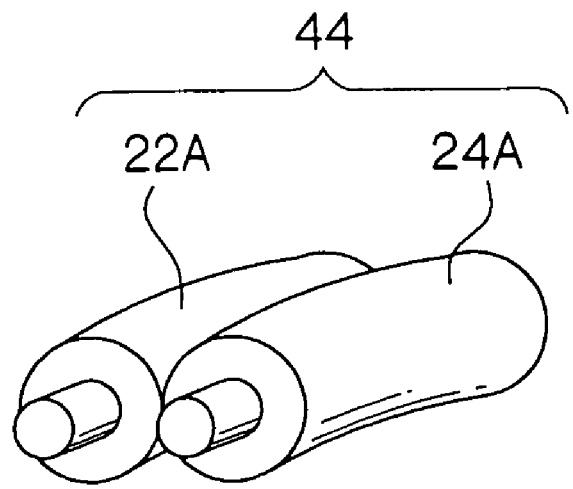
FIGS. 9A and 9B are figures showing modified examples of connecting wires structuring the pressure-sensitive sensor relating to the embodiment of the present invention.
Figure 9B:
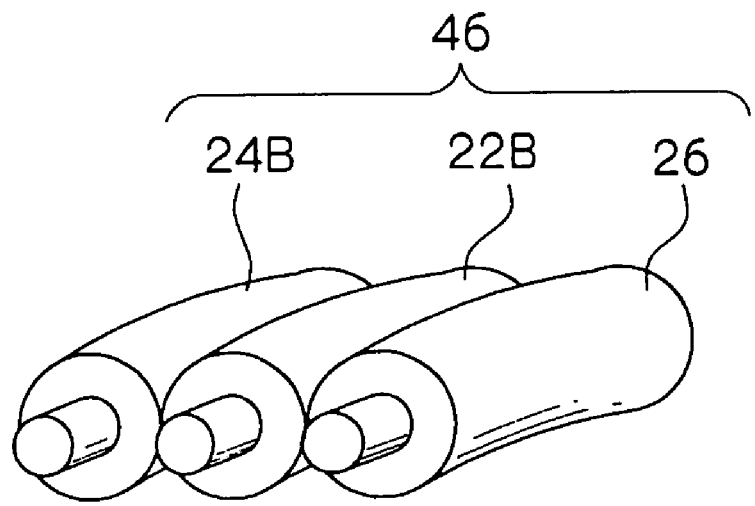

Further, as shown in FIG. 9A, one spiral projecting portion may be formed at the outer peripheral portion of the optical fiber 12 by the power source wire 22A for light-emission and the ground wire 24A for light-emission by using a two-wire-type covered conducting wire 44. Or, as shown in FIG. 9B, one spiral projecting portion may be formed by the power source wire 22B for light-reception, the ground wire 24B for light-reception, and the signal wire 26 by using a three-wire-type covered conducting wire 46.

The connecting wires (wires) which form the spiral projecting portions which function as pressure elements are not limited to having circular configurations in sectional view. Further, the portion which is covered by the cover member 42 may be a bare conducting wire.

In the above-described embodiments and modified example, an analog signal which corresponds to (is inversely proportional to) the deformation of the optical fiber 12 is outputted from the light-emitting element 20. However, the present invention is not limited to the same.

For example, by integrating a comparator or a CPU into the light-receiving element 20, on/off signals whose border is a predetermined amount of deformation of the optical fiber 12 may be outputted. Namely, the pressure-sensitive sensor 10 may be structured so as to have (a portion of) the functions of the foreign object catching detecting device.

Moreover, the above-described embodiments and modified example are preferable structures in which the light-emitting element 18 is structured by a light-emitting diode, and the light-receiving element 20 is structured by a phototransistor (a photodiode or CdS). However, the present invention is not limited to the same, and is not limited by the respective structures of or the combination of the light-emitting means and the light-receiving means.

In the above-described embodiments and modified example, the optical fiber 12 is formed by the core 14 which is formed from silicone rubber and the clad 16 which is formed from a flexible material such as a fluorine resin or the like, and the optical fiber 12 overall has a preferable elasticity (the characteristic that it is easy for a transmission loss to arise due to the optical fiber 12 being deformed by an external force). However, the present invention is not limited by the respective materials of or the combination of materials of the core and the clad which structure the optical fiber 12. It suffices for the optical fiber 12 to be a structure in which a change in the transmitted light amount arises due to deformation by an external force.

In addition, in the above-described embodiments and modified example, the pressure elements (the spiral projecting portions) are formed along substantially the entire length of the optical fiber 12 by the power source wire 22A for light-emission and the ground wire 24A for light-emission. However, the present invention is not limited to the same. For example, the pressure element may be formed by the power source wire 22A for light-emission or the like at only one longitudinal direction portion of the optical fiber 12 (a portion at which an improvement in sensitivity is desired).

The above-described modified example is a preferable structure in which the power source wire 22A for light-emission and the ground wire 24A for light-emission are held at the cover member 42 before assembly of the optical fiber 12. However, the present invention is not limited to the same. For example, the cover member 42 may be attached in a state in which the power source wire 22A for light-emission and the ground wire 24A for light-emission are wound around the outer peripheral portion of the optical fiber 12.

Moreover, in the above-described embodiments and modified example, an example is given of a structure in which the load detecting device of the present invention is structured as the pressure-sensitive sensor 10 which is applied to a foreign object catching sensing device of a vehicle. However, the load detecting device of the present invention is not limited to the same, and can be used in any application which detects a load.

In particular, the load detecting device of the present invention is suitably applied to applications in which the requisite range of detection is relatively long.

The above-described second embodiment is a preferable structure in which the light-emitting element 18 and the light-receiving element 20 are both attached to the longitudinal direction end portions of the optical fiber 12. However, the present invention is not limited to the same, and a structure may be used in which either one of the light-emitting element 18 and the light-receiving element 20 is attached to an end portion of the optical fiber 12.

Moreover, the structure for attaching the light-emitting element 18 and the light-receiving element 20 to the optical fiber and the structure for connecting the wires thereof is not limited to the preferable structure of the terminal holders 60 and the power supply terminals 70, 72, and any attaching structure and wire connecting structure may be used.

It goes without saying that the present invention is not limited by the presence/absence of or the structure of the sealing agent 76 and the covering portion 78.

Moreover, in the above-described second embodiment, a structure is shown in which the light-emitting portion 56 and the light-receiving portion 58 are provided at the both longitudinal direction end portions of the sensor main body 52 at which the light-emitting side power source wire 22A and the light-emitting side ground wire 24A are fixed to the outer peripheral surface of the optical fiber 12 by the surface coating layer 54. However, the present invention is not limited to the same. For example, the light-emitting element 18 and the light-receiving element 20 may be attached via the terminal holders 60 to the longitudinal direction end portions of the sensor main body 30 or the sensor main body 40.

The present invention is not limited to the structure in which the light-emitting portion 56 and the light-receiving portion 58 are provided respectively at the ends of the optical fiber 12. A structure is possible in which only one of the light-emitting element 18 and the light-receiving element 20 is provided at one longitudinal direction end of the sensor main body 30, 40, 52.

Moreover, the present invention is not limited by the structure for holding the light-emitting side power source wire 22A and the light-emitting side ground wire 24A to the optical fiber 12, or the like.

What is claimed is:

1. A load detecting device comprising:
an optical fiber of a predetermined length that deforms in response to an external force being applied to the load detecting device, thereby affecting an amount of light that may pass through the optical fiber;
a light-emitting device, disposed at a longitudinal direction one end side of the optical fiber, for emitting light and making the light incident from one end of the optical fiber;
a light-receiving device, disposed at a longitudinal direction other end side of the optical fiber, for receiving light which has passed through the optical fiber and outputting a signal corresponding to an amount of received light, the signal indicating the external force;
and a connecting wire formed in a spiral form along an outer periphery of the optical fiber, for energizing one of the light-emitting device and the light-receiving device.

2. The load detecting device of claim 1, wherein the load detecting device has a plurality of the connecting wires, and each connecting wire is formed in a spiral form running along the outer periphery of the optical fiber.

3. The load detecting device of claim 1, wherein the connecting wire is adhered to an outer peripheral surface of the optical fiber.

4. The load detecting device of claim 1, further comprising a cover member which is formed in a tubular shape and which covers the optical fiber in a state of making the connecting wire contact an inner surface of the cover member.

5. The load detecting device of claim 4, wherein the connecting wire is held at an inner peripheral portion of the cover member.

6. The load detecting device of claim 1, wherein the connecting wire, which is wound around an outer peripheral surface of the optical fiber in a spiral form, is held at the optical fiber by a covering layer which fits tightly to the connecting wire and the optical fiber.

7. The load detecting device of claim 1, wherein one of the light-emitting device and the light-receiving device is attached to a longitudinal direction end portion of the optical fiber.

8. The load detecting device of claim 7, wherein the one of the light-emitting device and the light-receiving device is attached to the longitudinal direction end portion of the optical fiber via a supporting member provided at the longitudinal direction end portion of the optical fiber.

9. The load detecting device of claim 8, wherein the one of the light-emitting device and the light-receiving device is connected to the connecting wire via a connecting portion disposed on the supporting member.

10. The load detecting device of claim 8, wherein the supporting member has a grasping portion which nips and holds the longitudinal direction end portion of the optical fiber via the connecting wire.

11. The load detecting device of claim 1, wherein a region between a longitudinal direction end surface of the optical fiber and one of the light-emitting device and the light-receiving device is sealed by a sealing agent which is light transmissive.

12. A load detecting device comprising:
an optical fiber of a predetermined length;
a light-emitting device, disposed at a longitudinal direction one end side of the optical fiber, for emitting light and enabling the light to be incident from one end of the optical fiber;
a light-receiving device, disposed at a longitudinal direction other end side of the optical fiber, for receiving light which has passed through the optical fiber and able to output a signal corresponding to an amount of received light;
and a connecting wire able to form a closed circuit for energizing the light-emitting device and the light-receiving device, wherein one portion of the connecting wire is provided in a spiral form along an outer periphery of the optical fiber, as a pressure element for generating local deformation at the optical fiber.

13. The load detecting device of claim 12, wherein the one portion of the connecting wire is formed in a plurality of spiral forms along the outer periphery of the optical fiber.

14. The load detecting device of claim 13, wherein a pitch of respective spirals of the connecting wire and an interval between respective spirals of the connecting wire are structured so as to be maintained at predetermined values.

15. The load detecting device of claim 12, wherein a pitch of a spiral of the connecting wire is structured so as to be maintained at a predetermined value.

16. The load detecting device of claim 15, wherein the connecting wire is adhered to an outer peripheral surface of the optical fiber.

17. The load detecting device of claim 15, wherein the connecting wire, which is wound around an outer peripheral surface of the optical fiber in a spiral form, is held at the optical fiber by a covering layer which fits tightly to the connecting wire and the optical fiber.

18. The load detecting device of claim 12, further comprising a cover member which is formed in a tubular shape and which covers the optical fiber in a state of making the connecting wire contact an inner surface of the cover member.

19. The load detecting device of claim 18, wherein the connecting wire is held at an inner peripheral portion of the cover member.

20. The load detecting device of claim 12, wherein the light-emitting device is connected to the longitudinal direction one end of the optical fiber such that a relative position of the light-emitting device with respect to the longitudinal direction one end is stable, and the light-receiving device is connected to the longitudinal direction other end of the optical fiber such that a relative position of the light-receiving device with respect to the longitudinal direction other end is stable.

21. The load detecting device of claim 12, wherein a region between a longitudinal direction end surface of the optical fiber and one of the light-remitting device and the light-receiving device is sealed by a sealing agent which is light transmissive.

22. The load detecting device of claim 12, wherein the optical fiber of a predetermined length deforms in response to an external force being applied to the load detecting device, thereby affecting an amount of light that may pass through the optical fiber; and the signal output by the light-receiving device indicates the external force.

* * * * *